United States Patent [19]

Todoroki

[11] Patent Number: 4,959,813
[45] Date of Patent: Sep. 25, 1990

[54] SERIAL INPUT-OUTPUT CIRCUIT FOR FORWARD AND BACKWARD PRODUCING BITS FROM BIDIRECTIONAL SHIFT REGISTERS

[75] Inventor: Toshiya Todoroki, Tokyo, Japan

[73] Assignee: NEC Corporation, Tokyo, Japan

[21] Appl. No.: 338,070

[22] Filed: Apr. 14, 1989

[30] Foreign Application Priority Data

Apr. 14, 1988 [JP] Japan .................................. 63-92831

[51] Int. Cl.$^5$ .............................................. G11C 7/00
[52] U.S. Cl. ................................ 365/189.12; 365/221; 365/240
[58] Field of Search ..................... 365/73–78, 365/189.12, 240, 221, 219

[56] References Cited

U.S. PATENT DOCUMENTS 4,813,015  3/1989  Spak et al. ............................ 365/78
4,864,544  9/1989  Spak et al. ....................... 365/189.05

*Primary Examiner*—James W. Moffitt
*Attorney, Agent, or Firm*—Sughrue, Mion, Zinn, Macpeak & Seas

[57] ABSTRACT

In a serial input-output circuit comprising a memory device (15) for memorizing an input serial bit sequence as memorized bit groups, each consisting of a predetermined number of parallel bits, first and second bidirectional shift registers (21, 22) are serially connected through a ring connection (24, 25). A storing arrangement (35–37) is connected to the respective shift registers and directly to the memory device for bit parallel storage of the parallel bits of a selected one of the memorized bit groups in a selected one of the shift registers. An output serial bit sequence is produced from one of the shift registers selectively forwardly and backwardly as regards time relative to the input serial bit sequence. The storing arrangement may comprise a register selector (35) and first and second bit parallel connections (36, 37). The register selector selects the selected shift register and bit parallel loads the selected shift register with the parallel bits of the selected bit group through one of the bit parallel connections that is connected to the selected shift register.

4 Claims, 4 Drawing Sheets

SERIAL INPUT-OUTPUT CIRCUIT FOR FORWARD AND BACKWARD PRODUCING BITS FROM BIDIRECTIONAL SHIFT REGISTERS

BACKGROUND OF THE INVENTION

This invention relates to a serial input-output circuit which has a circuit input terminal supplied with an input serial bit sequence and is for use as an interface between the input terminal and a processing circuit for processing an output serial bit sequence supplied from the serial input-output circuit selectively forwardly and backwardly of the input serial bit sequence.

A prior art serial input-output circuit is described in an article contributed by G. David Forney, Jr., and Edward K. Bower to the IEEE Transactions on Communication Technology, Volume COM-19, No. 5 (October 1971), pages 821 to 835, under the title of "A High-Speed Sequential Decoder: Prototype Design and Test". In the manner which will later be described a little more in detail, the prior art serial input-output circuit comprises an input shift register supplied with the input serial bit sequence for producing a sequence of output bit groups, each consisting of a first predetermined number of parallel bits. A memory device is used to memorize the parallel bits of the output bit groups as parallel bits of memorized bit groups. A producing arrangement includes a series connection of first and second bidirectional or right-left shift registers and is connected to the memory device to produce a predetermined part of the memorized bit groups as the output serial bit sequence forwardly and backwardly as regards time relative to the input serial bit sequence.

Each of the first and the second (bidirectional) shift registers may have a memory capacity for one memorized bit group. A first selected one of the memorized bit groups is read bit parallel from the memory device into a parallel-to-series converter. Through the converter and an intermediate selector having one of two input terminals connected to the converter and a single output terminal connected to the first shift register, the parallel bits of the first selected bit group are stored in bit series or sequence in the first shift register. It is possible while shifting the parallel bits in bit series forward from the first shift register to the second one to successively store the parallel bits of a second selected one of the memorized bit groups in bit series from the converter in the first shift register. In this manner, the parallel bits of two memorized bit groups are held as total held bits at a time in the first and the second shift registers.

Ordinarily, the second selected bit group next follows the first selected bit group in the input serial bit sequence. The total held bits are therefore arranged in the first and the second shift registers from an earliest bit to a latest bit. More particularly, the earliest bit is one of the parallel bits of the first selected bit group that is earliest stored in the first shift register from the converter. The latest bit is one of the parallel bits of the second selected bit group that is latest stored in the first shift register from the converter. While subjected to a forward shift from the first shift register to the second one, the held bits are delivered from the second shift register to the other of the two input terminals of the intermediate selector and from the intermediate selector to the first shift register. In this manner, the total held bits are circulated through the first and the second shift registers and the intermediate selector with the latest bit followed by the earliest bit.

Let it be assumed that a second predetermined number of output serial bits should be produced as the output serial bit sequence, through a circuit output terminal connected to a point of connection between the first and the second shift registers, starting at a predetermined one of the total held bits forwardly along the input serial bit sequence. If the latest bit is covered by the second predetermined number of bits, the memory device and the intermediate selector must be controlled to supply the first shift register in bit series with the parallel bits of a third selected one of the memorized bit groups that next follows the second selected bit group.

On subjecting the total held bits to a backward shift from the second shift register to the first one, the intermediate selector is not used. The total held bits are merely repeatedly circulated through the second and the first shift registers with the earliest bit followed by the latest bit.

Let it now be assumed that a third predetermined number of output serial bits should be produced as the output serial bit sequence through the circuit output terminal, starting at a preselected one of the total held bits backwardly along the input serial bit sequence. If the earliest bit is covered by the third predetermined number of bits, the first and second bidirectional shift registers are forced to shift forwardly by the fourth predetermined number of bits.

In this manner, once memorized bit group is read out from the memory device, a fourth one of the memorized bit groups that next preceds the memorized bit group. Namely, this serial input-output circuit has a limited value when the first and second bidirectional shift registers shift backwardly. It is possible to vary the limited value either by giving a large memory capacity to the second bidirectional shift register or by additionally using another bidirectional shift register. This is, however, undesirable in implementing the serial input-output circuit by an integrated circuit.

SUMMARY OF THE INVENTION

It is therefore an object of the present invention to provide a serial input-output circuit capable of producing an output serial bit sequence with its output serial bits readily arranged either forwardly or backwardly of an input serial bit sequence as desired.

It is another object of this invention to provide a serial input-output circuit of the type described, which includes a memory device for memorizing the input serial bit sequence for bit parallel read out and in which the memory device must be accessed as least frequently as possible.

It is still another object of this invention to provide a serial input-output circuit of the type described, which can readily be implemented by an integrated circuit.

Other objects of this invention will become clear as the description proceeds.

On describing the gist of this invention, it is possible to understand that a serial input-output circuit comprises an input shift register supplied with an input serial bit sequence for producing a sequence of output bit groups, each consisting of a first predetermined number of parallel bits, a memory device for memorizing the output bit groups as memorized bit groups, and output means connected to the memory device for producing a predetermined part of the memorized bit groups as an output serial bit sequence selectively forwardly and backwardly of the input serial bit sequence.

According to this invention, the output means comprises: (a) first and second bidirectional shift registers, each for one of the memorized bit groups; (b) storing means connected to the memory device and the first and the second bidirectional shift registers for bit parallel storing the parallel bits of a selected one of the memorized bit groups as partial held bits in a selected one of the first and the second bidirectional shift registers; (c) shifting means for bidirectionally shifting through the first and the second bidirectional shift registers total held bits held in the first and the second bidirectional shift registers; and (d) producing means connected to one of the first and the second bidirectional shift registers for producing a second predetermined number of the total held bits in bit series as the predetermined part of the memorized bit groups.

DESCRIPTION OF THE PREFERRED EMBODIMENT

Figure 1:
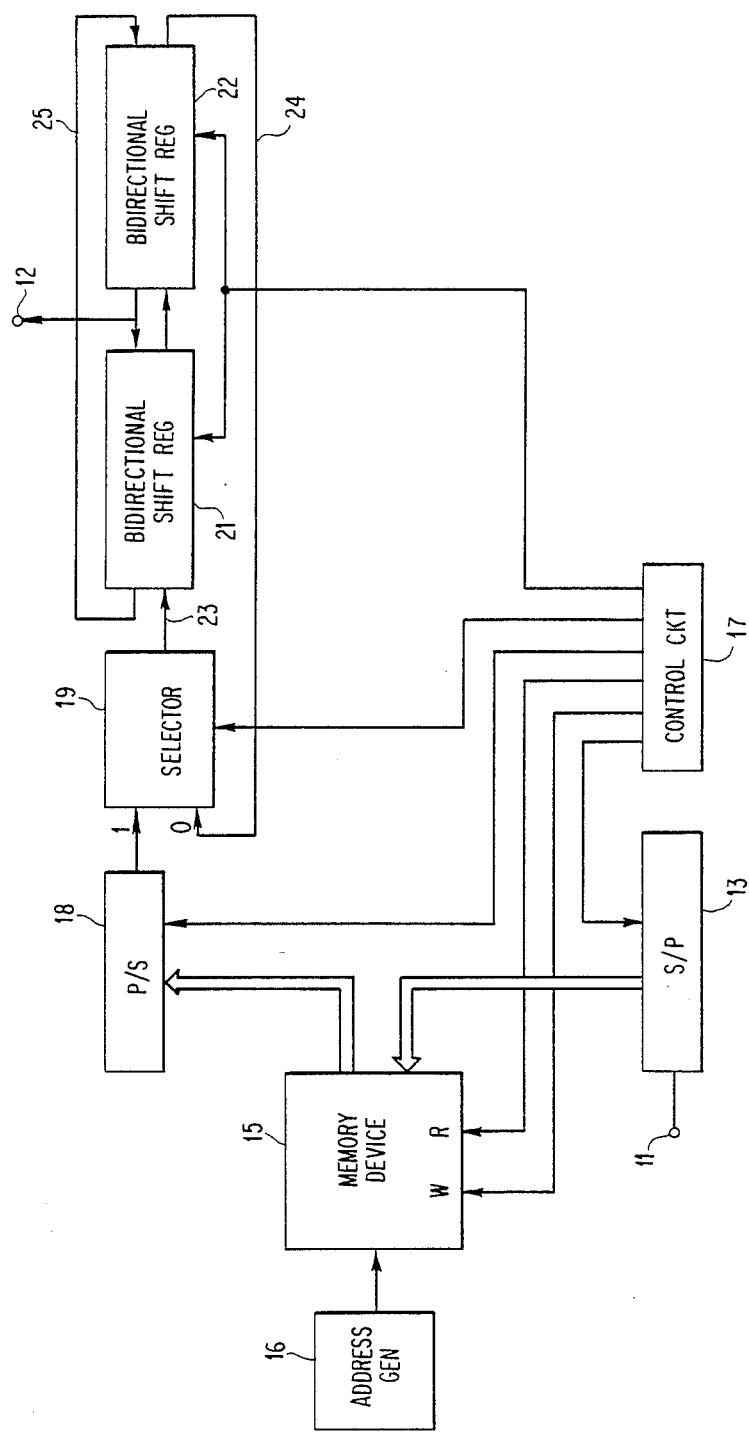
FIG. 1 is a block diagram of a conventional serial input-output circuit.

Referring to FIG. 1, a conventional serial input-output circuit will be described at first in order to facilitate an understanding of the present invention. The conventional serial input-output circuit is designed as a prior art serial input-output circuit with reference to the Forney, Jr., et al article cited heretobefore.

In FIG. 1, the serial input-output circuit has circuit input and output terminals 11 and 12. The circuit input terminal 11 is supplied with an input serial bit sequence consisting of input serial bits. The serial input-output circuit is for delivering an output serial bit sequence of output serial bits through the circuit output terminal 12 to a processing circuit with the output serial bit sequence moved selectively forwardly and backwardly of the input serial bit sequence, namely, with the output serial bits arranged selectively forwardly and backwardly along the input serial bits. If necessary, it is possible to understand that the processing circuit is depicted at 12.

An input shift register 13 is supplied with the input serial bit sequence in bit series or sequence through the circuit input terminal 11 and bit parallel produces a sequence of output bit groups, each consisting of a first predetermined number of parallel bits. The input shift register 13 therefore serves as a series-to-parallel (S/P) converter and is so labelled in FIG. 1.

A memory device 15 has a plurality of memory sectors, each for memorizing the parallel bits of one of the output bit groups as parallel bits of a memorized bit group and for bit parallel producing the parallel bits of the memorized bit group. An address generator 16 is used to indicate the memory sectors one at a time. A control circuit 17 is for making, among others, the input shift register 13 produce each output bit group for write (W) in the memory device 15, making the address generator 16 specify one of the memory sectors. The control circuit 17 controls the address generator 16 through a connection which is not depicted merely for simplicity of the illustration.

An intermediate shift register 18 is for memorizing each memorized bit group and serves as a parallel-to-series (P/S) converter. An intermediate selector 19 has first and second input terminals and a single output terminal. The first and the second input terminals are indicated by 1 (one) and 0 (zero).

A series connection of first and second bidirectional or right-left shift registers 21 and 22 is connected to the single output terminal of the intermediate selector 19. More particularly, the first (bidirectional) shift register 21 has a first forward or left and a first backward or right input terminal and a first forward and a first backward output terminal. The second shift register 22 has a second forward and a second backward input terminal and a second forward and a second backward output terminal. By a first connection, the first forward output terminal is connected to the second forward input terminal. By a second connection, the second backward output terminal is connected to the first backward input terminal. The circuit output terminal 12 is connected to a point of connection between the second connection and the second backward output terminal.

An input connection 23 is used to connect the single output terminal of the intermediate selector 19 to the first forward input terminal. By a forward connection 24 depicted downwardly of the first and the second shift registers 21 and 22, the second forward output terminal is connected to the second input terminal of the intermediate selector 19. By a backward connection 25 depicted upwardly of the shift registers 21 and 22, the first backward output terminal is connected directly to the second backward input terminal.

It will be presumed for the time being that each of the first and the second shift registers 21 and 22 has a memory capacity for one memorized bit group. In the manner which will presently be described, the parallel bits of two memorized bit groups are held in the shift registers 21 and 22 at a time as total held bits. The control circuit 17 controls the shift registers 21 and 22 so that the held bits may be subjected selectively to a forward shift from the first shift register 21 to the second shift register 22 and to a backward shift from the second shift register 22 to the first shift register 21.

Under the control of the address generator 16 and the control circuit 17, a first selected one of the memorized bit groups is read (R) bit parallel from the memory device 15 into the intermediate shift register 18. The control circuit 17 is furthermore used to select the first input terminal of the intermediate selector 19, to carry out the forward shift, and to make the intermediate shift register 18 produce the parallel bits of the first selected bit group in bit series so that the parallel bits of the first selected bit group are stored in the first shift register 21 as partial held bits. After storage of the first selected bit group from the intermediate shift register 18 in the first shift register 21, the intermediate shift register 18 can be loaded bit parallel with the parallel bits of a second selected one of the memorized bit groups. It is possible while carrying out the forward shift to store the second selected bit group in bit series in the first shift register 21 through the intermediate selector 19 and the input connection 23. In this manner, the above-mentioned total held bits are held in the shift registers 21 and 22.

During the forward shift, the second selected bit group next follows the first selected bit group when attention is directed to the input serial bit sequence. The total held bits are therefore arranged in the first and the second shift registers 21 and 22 from an earliest bit to a latest bit. More specifically, the earliest bit is one of the parallel bits of the first selected bit group that is earliest stored in the first shift register 21 from the intermediate shift register 18 through the intermediate selector 19 and the input connection 23. The latest bit is one of the parallel bits of the second selected bit group that is latest stored in the first shift register 21. When subjected to the forward shift with the control circuit 17 made to select the second input terminal of the intermediate selector 19, the total held bits are circulated through the first and the second shift registers 21 and 22, the forward connection 24, the intermediate selector 19, and the input connection 23.

Let it be assumed that a second predetermined number of output serial bits should be produced through the circuit output terminal 12 as the output serial bit sequence starting at a predetermined one of the total held bits forwardly along the input serial bit sequence. If the latest bit is covered by the second predetermined number of bits, the control circuit 17 must be made to switch the second input terminal of the intermediate selector 19 to the first one to supply the first shift register 21 from the intermediate shift register 18 with the parallel bits of a third selected one of the memorized bit groups that next follows the second selected bit group.

On subjecting the total held bits merely to the backward shift, the intermediate selector 19 is not used. The held bits are repeatedly circulated through the second and the first shift registers 22 and 21 and through the backward connection 25.

Let it now be assumed that a third predetermined number of output serial bits should be produced through the circuit output terminal 12 as the output serial bit sequence starting at a preselected one of the total held bits backwardly along the input serial bits. If the earliest bit is covered by the third predetermined number of bits, the first and second bidirectional shift registers 21 and 22 are forced to shift forwardly by the fourth predetermined number of bits.

In this manner, once memorized bit group is read out from the memory device 15, a fourth one of the memorized bit group that preceds the memorized bit group. Namely, this serial input-output has a limited value when the first and second bridirectional shift registers 21 and 22 shift backwardly. It is possible to vary the limited either by giving a large memory capacity to the second bidirectional shift register 22 or by additionally using another bidirectional shift register (not shown). This is, however, undesirable in implementing the serial input-output circuit by an integrated circuit.

Incidentally, it is possible in FIG. 1 to understand that a combination of the intermediate shift register 18, the intermediate selector 19, and the first and the second bidirectional shift registers 21 and 22 serves as an output arrangement in cooperation with the address generator 16, the control circuit 17, and others. Connected to the memory device 15, the output arrangement produces a predetermined part of the memorized bit groups, such as the second or the third predetermined number of bits, as the output serial bit sequence selectively forwardly and backwardly of the input serial bit sequence.

Figure 2:
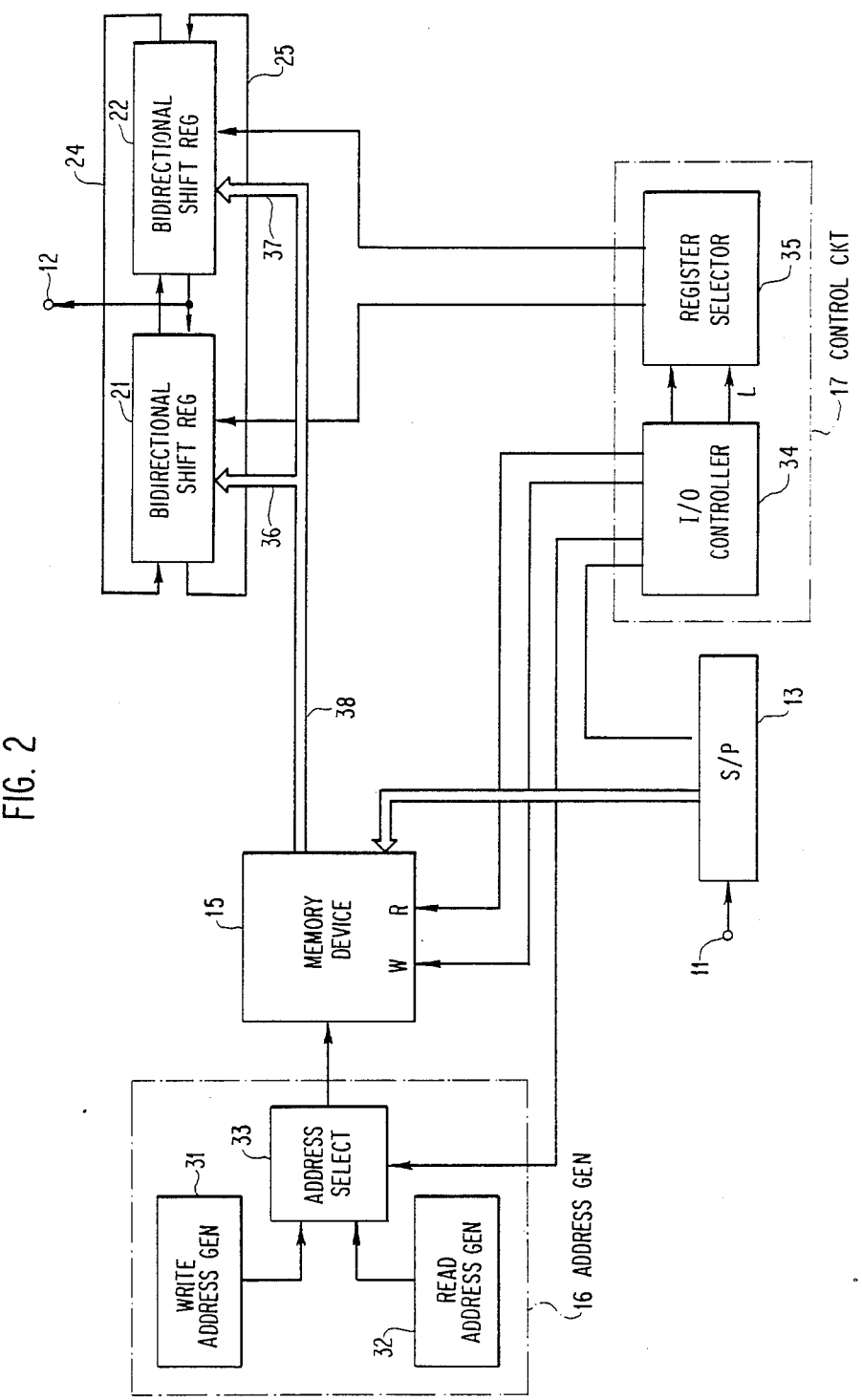
FIG. 2 is a block diagram of a serial input-output circuit according to an embodiment of the instant invention.
Figure 3:
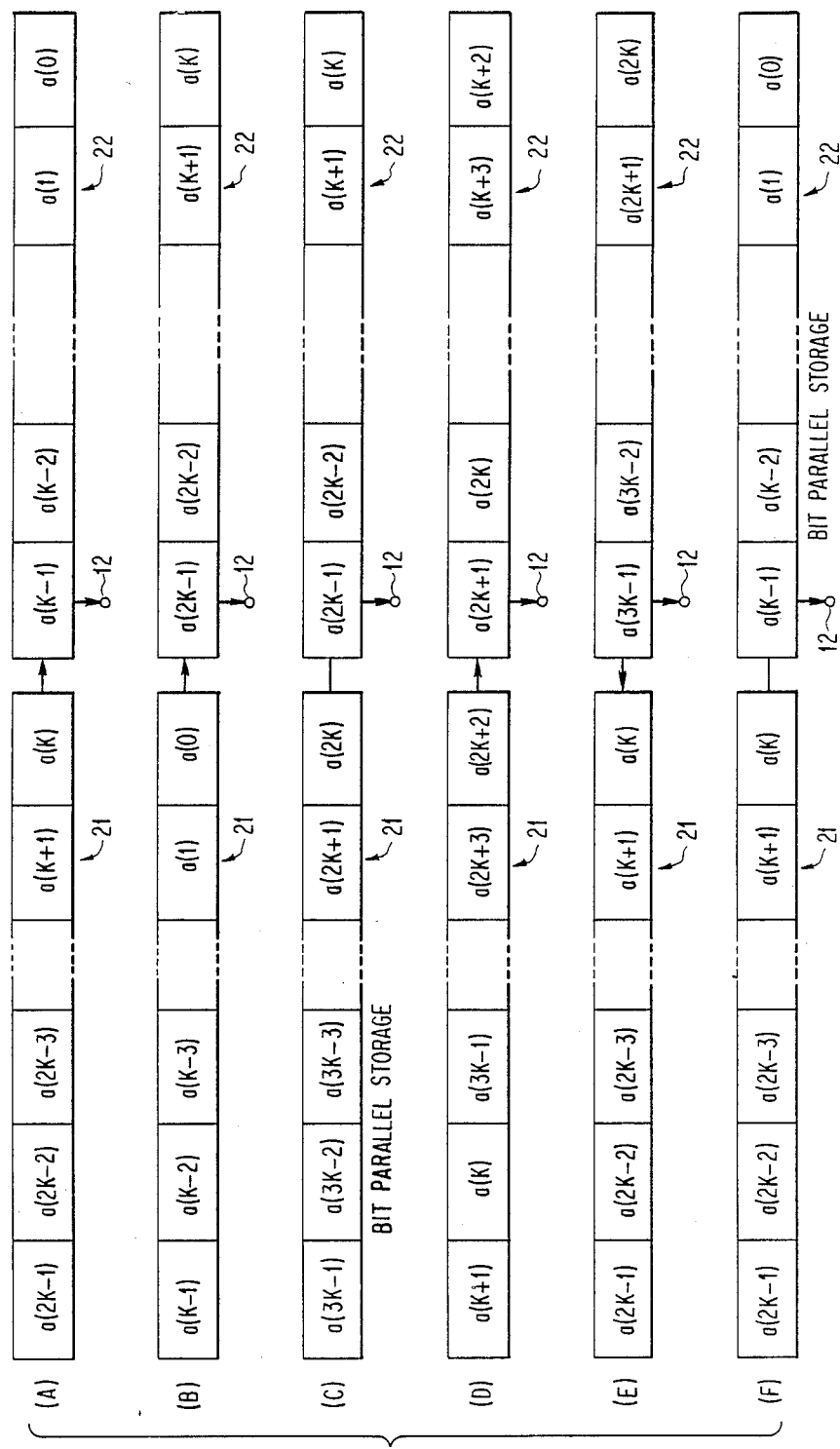
FIG. 3 is a diagram for use in describing operation of the serial input-output circuit depicted in FIG. 2.

Referring now to FIGS. 2 and 3, the description will proceed to a serial input-output circuit according to a preferred embodiment of the instant invention. Similar parts are designated by like reference numerals and are likewise operable. It is to be noted in connection with FIG. 2 that the address generator 16 and the control circuit 17 are depicted more in detail, that the intermediate shift register 18 and selector 19 are excluded together with the input connection 23, and that the control circuit 17 is operable accordingly simpler than that described in connection with FIG. 1. The first and the second connections may alternatively be referred to collectively as a bidirectional connection. The forward and the backward connections 24 and 25 may collectively be called a ring connection. It should, however, be noted that the forward and the backward connections 24 and 25 are for shifting the total held bits forwardly or rightwardly of the figure and backwardly or leftwards, respectively.

In FIG. 2, the address generator 16 comprises a write address generator 31 for generating a write address signal indicative of the memory sectors of the memory device 15 for write (W). A read address generator 32 generates a read address signal indicative of one of the memory sectors for read (R). An address selector 33 is for supplying the memory device 15 selectively with the write and the read address signals.

The control circuit 17 comprises an input-output controller 34 for controlling the input shift register 13, write and read of the memory device 15, and the address selector 33. A register selector 35 is connected to the first and the second bidirectional shift registers 21 and 22 to simultaneously make the shift registers 21 and 22 carry out one of the forward and the backward shifts and to select one of the first and the second (bidirectional) shift registers 21 and 22 as a selected shift register for bit parallel load of the parallel bits of one of the memorized bit groups that is memorized in the memory device 15 at the memory sector accessed by the read address signal and is produced from the memory device 15 as a selected bit group.

Through one of two control leads illustrated parallel, the input-output controller 34 controls the register selector 35 for selection of the selected shift register. Through the other of the two control leads that is labelled L, the input-output controller 34 makes the register selector 35 carry out bit parallel load of the selected bit group on the selected shift register. The input-output controller 34 may be manually controlled for the simultaneous forward and backward shifts and for the bit parallel load on the selected shift register. Like an input-output controller which is included in the control circuit 17 described in conjunction with FIG. 1, the input-output controller 34 is so controlled in practice by the processing circuit.

It should now be clearly noted in connection with FIG. 2 that the second forward output terminal of the second shift register 22 is connected to the first forward input terminal of the first shift register 21 directly through the forward connection 24 which is now drawn upwardly of the shift registers 21 and 22. The backward connection 25 is depicted downwardly of the shift registers 21 and 22 and is used like in FIG. 1. It will be said under the circumstances that the first and the second shift registers 21 and 22 are in a ring connection.

It should also be noted in FIG. 2 that first and second bit parallel connections 36 and 37 are connected to the first and the second shift registers 21 and 22 and to a common bit parallel connection 38, which is connected directly to the memory divice 15. It is therefore possible to understand that the first and the second bit parallel connections 36 and 37 are connected directly to the memory device 15. Through one of the first and the second bit parallel connections 36 and 37 that is connected to the selected shift register, the memory device 15 bit parallel supplies the parallel bits of the selected bit group to the selected shift register.

It is now understood as regards FIG. 2 that the register selector 35 serves in cooperation with the input-output controller 34 as a register selecting arrangement for selecting the selected shift register. Controlled by the input-output controller 34, a combination of the read address generator 32 and the address selector 33 serves as a group selecting arrangement for selecting the selected bit group. Controlled by the input-output controller 34 and coupled to the first and the second bit parallel connections 36 and 37 and to the group selecting arrangement, the above-mentioned other L of the two control leads serves as a supplying arrangement for supplying the selected bit group to the selected shift register.

From a different point of view, a combination of the first and the second bit parallel connections 36 and 37 serves in cooperation with the register selecting arrangement, the group selecting arrangement, and the supplying arrangement as a storing arrangement for bit parallel storing the parallel bits of the selected bit group as the afore-mentioned partial bits in the selected shift register. On the other hand, the ring connection, namely, a combination of the forward and the backward connections 24 and 25, serves in cooperation with the bidirectional connection and with a shift or clock pulse generator as a shifting arrangement for selectively forwardly and backwardly shifting through the first and the second shift registers 21 and 22 the total held bits which are held in the first and the second shift registers 21 and 22 and consist of two groups of partial held bits. The shift pulse generator is not depicted merely for simplicity of the illustration. If necessary, the forward and the backward connections 24 and 25 should be understood to represent the shift pulse generator.

The circuit output terminal 12 may alternatively be called a producing arrangement. A combination of the first and the second shift registers 21 and 22, the storing arrangement, the shifting arrangement, and the producing arrangement serves as the output arrangement mentioned in connection with the conventional series input-output circuit. In marked contrast to the output arrangement used in the conventional input-output circuit, the output arrangement is astonishingly simple in structure and is unexpectedly excellently operable in the input-output circuit being illustrated in the manner which will become clear later in the following.

In FIG. 2, it will be surmised that each of the input shift register 13 and the first and the second shift registers 21 and 22 has a memory capicity of a first predetermined number K of bits. In other words, each of the shift registers 13, 21, and 22 has zeroth through (K−1)-th stages controlled by the shift pulse generator mentioned before. In the first shift register 21, the zeroth stage serves as the first forward input and the first backward output terminals. The (K−1)-th stage serves as the first forward output and the first backward input terminals. In the second shift register 22, the zeroth stage serves as the second forward input and the second backward output terminals. The (K−1)-th stage serves as the second forward output and the second backward input terminals. The first predetermined number K may typically be equal to eight.

The memory device 15 may have 1,024 memory sectors, each for K parallel bits. Depending on the circumstances, the memory sectors will be numbered from a zeroth memory sector up to a 1,023-rd one. In the manner known in the art, the input-output controller 34 can monitor the input and the first and the second shift registers 13, 21, and 22 and can detect a request for production of an output serial bit sequence.

Let the circuit input terminal 11 be supplied with an input serial bit sequence consisting of zeroth, first, and other input binary bits a(0), a(1), and so forth. When the zeroth through the (K−1)-th input binary bits a(0) to a(K−1) are stored in bit series in the input shift register 13, the input-output controller 34 makes the write address generator 31 produce the write address signal with indication of the zeroth memory sector of the memory device 15, controls the address selector 33 so as to select the write address signal, and energizes the memory device 15 for bit parallel storage of the zeroth through the (K−1)-th binary bits in the zeroth memory sector as the parallel bits of a zeroth memorized bit group. In this manner, the output bit groups of the input shift register 13 are successively stored in the first and other memory sectors of the memory device 15 as first, second, and other memorized bit groups.

In the meantime, the input-output controller 34 makes the read address generator 32 produce the read address signal with indication of the zeroth memory sector of the memory device 15, controls the address selector 33 so as to select this read address signal, and energizes the memory device 15 for bit parallel delivery of the zeroth through the (K−1)-th bits of the zeroth memorized bit group as the parallel bits of the selected bit group to the common bit parallel connection 38. The input-output controller 34 furthermore makes the register selector 35 select the first shift register 21 as the selected shift register and bit parallel loads the selected shift register with the zeroth through the (K−1)-th bits as the partial held bits through the first bit parallel connection 36.

While subjecting the partial held bits to the forward shift from the first shift register 21 to the second shift register 22, the read address signal is made to indicate the first memory sector. The address selector 33 is kept to select the read address signal. The register selector 35 is kept to select the first shift register 21 as the selected shift register. As soon as the partial held bits are shifted out of the first shift register 21, the K-th through the (2K−1)-th bits of the first memorized bit group are bit parallel stored from the memory device 15 in the first shift register 21 as new partial held bits through the first bit parallel connection 36.

In FIG. 3, the zeroth through the (K−1)-th stages of the first and the second shift registers 21 and 22 are depicted from left to right. In an initial state depicted along a first or top line FIG. 3(A), the zeroth through the (2K−1)-th bits are held as the total held bits in the second and the first shift registers 22 and 21. The zeroth and the (2K−1)-th bits are the earliest and the latest bits described before despite simultaneous storage of the zeroth through the (K−1)-th bits and of the K-th through the (2K−1)-th bits.

Let it be assumed that the input-output controller 34 detects a first request for production of a predetermined part of the memorized bit groups through the circuit output terminal 12 as the output serial bit sequence and that the output serial bit sequence should consist of a second predetermined number, such as (K+2), of output binary bits which start at a predetermined one of the total held bits, such as the K-th bit a(K), and should be produced forwardly as regards time relative to the input serial bit sequence. From the initial state depicted in FIG. 3 (A), the total held bits are forwardly shifted to an intermediate state illustrated FIG. 3 labelled (B). As soon as forward shifted to the zeroth stage of the second shift register 22, each held bit is delivered to the circuit output terminal 12 as one of the output binary bits.

In the second predetermined number of the output binary bits, the output serial bit sequence should include the 2K-th and the (2K+1)-th bits which follow the latest bit a(2K−1) and are not held in the first and the second shift registers 21 and 22. This fact is sensed by the input-output controller 34 in the known manner. The input-output controller 34 therefore makes the read address generator 32 generate the read address signal with indication of the second memory sector of the memory device 15. In the manner described above, the 2K-th through the (3K−1)-th bits of the second memorized bit group are bit parallel stored from the memory device 15 in the first shift register 21 as fresh partial held bits through the first bit parallel connection 36. It will be understood that the parallel bits of the second memorized bit group are substituted in the total held bits for the parallel bits of the zeroth memorized bit group.

The total held bits become as illustrated in FIG. 3 (C). The forward shift is continued two more stages or bits to produce the 2K-th and the (2K+1)-th bits as a trailing part of the output serial bit sequence. When the output serial bit sequence is wholly produced as requested, the input-output controller 34 suspends the forward shift. The total held bits become as depicted in FIG. 3 (D). It will be seen that the total held bits are forward shifted (2K+2) bits from the initial state illustrated in FIG. 3 (A) to a suspended state depicted in FIG. 3 (D) with the second memorized bit group substituted in the suspended state for the zeroth memorized bit group. In the suspended state, the K-th and the (3K−1)-th bits afresh become the earliest and the latest bits.

Let it now be assumed that the input-output controller 34 detects a second request for a (2K+2)-bit backward shift from the suspended state as regards time relative to the input serial bit sequence. Although production of the output serial bit sequence is unnecessary during the backward shift, it is possible to understand that (2K+2) output binary bits are produced as the output serial bit sequence starting at one of the total held bits that is held in the suspended state in the zeroth stage of the second shift register 22. In any event, the backward shift is back to the earliest bit a(K). Sensing this fact, the input-output controller 34 carries through the backward shift without substituting a certain one of the memorized bit groups for either of the two selected bit groups which are held in the first and the second shift registers 21 and 22 as the total held bits.

If the backward shift should be carried out in connection with a third predetermined number of output binary bits including at least one of the parallel bits of the memorized bit groups, such as the (K−1)-th bit and at least one earlier or more backward bit, that is not included in the total held bits in the suspended state depicted in FIG. 3 (D), this fact is sensed by the input-output controller 34 in the known manner together with a progress of the backward shift to another intermediate state illustrated in FIG. 3 (E). The input-output controller 34 thereupon makes the read address signal indicate one of the memorized bit groups that precedes the partial held bits including the earliest bit.

In the case being illustrated, the above-mentioned one of the memorized bit groups is the zeroth memorized bit group. The input-output controller 34 makes the read address signal indicate the zeroth memory sector of the memory device 15, controls the address selector 33 so as to select the last-mentioned read address signal, controls the register selector 35 so as to select the second shift register 22 as the selected shift register, and energizes the memory device 15 for bit parallel delivery of the parallel bits of the zeroth memorized bit group to the common bit parallel connection 38. The input-output controller 34 furthermore makes the register selector 35 load the second shift register 22 bit parallel with the parallel bits of the zeroth memorized bit group through the second bit parallel connection 37. In the second shift register 22, the zeroth through the (K−1)-th bits are substituted for the 2K-th through the (3K−1)-th bits. The total held bits become a renewed state illustrated in FIG. 3 (F).

With the serial input-output circuit illustrated with reference to FIGS. 2 and 3(A) to (F), it is now clearly understood in marked contrast to the conventional one described in conjunction with FIG. 1 that the output serial bit sequence can be produced substantially unlimitedly forwardly and backwardly of the input serial bit sequence. A limit is imposed only by the memory capacity of the memory device 15.

Reviewing FIGS. 2 and 3(A) to (F), it is understood that the earliest and the latest bits are two of the parallel bits of two successively selected bit groups and are supplied earliest and latest to the selected shift register as regards the forward shift of the total held bits through the first and the second shift registers 21 and 22. More particularly, the earliest and the latest bits are supplied earliest and latest if the parallel bits of the two successively selected bit groups were bit series supplied to the first shift register 21 rather than bit parallel. Under the circumstances, the register selecting arrangement selects a particular one of the first and the second shift registers 21 and 22 as the selected shift register that holds the earliest and the latest bits if at least one, such as a(2K) or a(K−1), should be produced in the output serial bit sequence following the latest and the earliest bits while the output serial bit sequence is produced forwardly and backwardly of the input serial bit sequence, respectively. In either event, the group selecting arrangement selects as a single selected bit group one of the memorized bit groups that follows and precedes the two successively selected bit groups. The supplying arrangement supplies the parallel bits of the single selected bit group bit parallel to the particular one of the first and the second shift registers 21 and 22.

Figure 4:
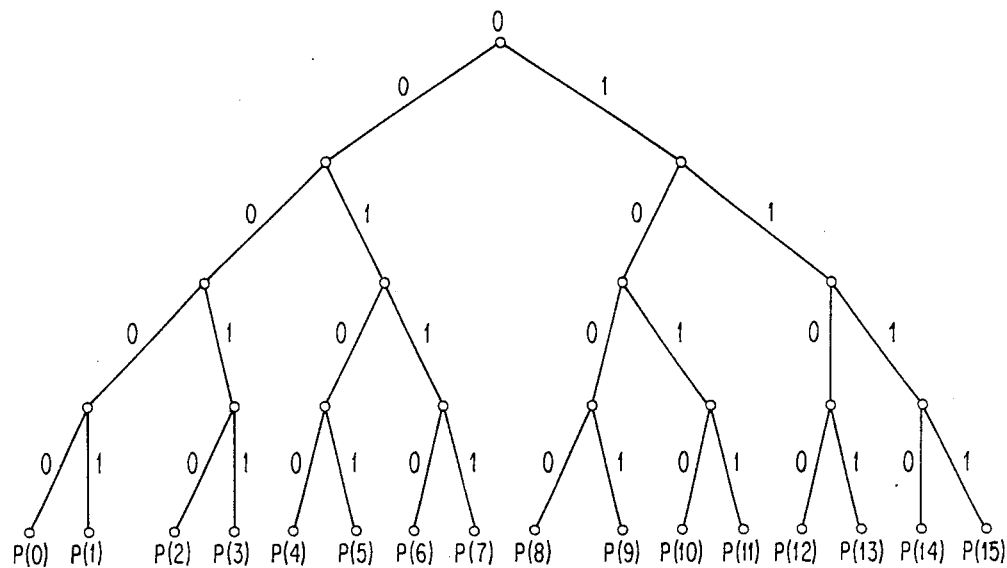
FIG. 4 is a tree diagram illustrative of binary bits which can be processed by the serial input-output circuit illustrated in FIG. 2.

Turning to FIG. 4, a plurality of binary bits are depicted in a simple tree structure. That is, zeroth through fifteenth paths start from an origin O (oh) and end at zeroth through fifteenth end points P(0) to P(15) passing through intermediate nodes. The origin and the end points are also nodes. Only one binary bit, namely, a binary zero or one bit, is assigned to a path part between two adjacent nodes. When viewed from the origin towards the end points, a path part regularly branches into two path parts.

The processing circuit may be used to locate an optimum path from the origin to an optimum end point. On using the serial input-output circuit illustrated with reference to FIGS. 2 and 3 as an interface between the circuit input terminal 11 and the processing circuit, the zeroth and other input serial bits may represent the binary bits along the zeroth path, the binary bit of the path part ending at the first end point P(1), and so on. The serial input-output circuit help the processing one that can produce various output serial bit sequences with the path parts readily forwardly traced from the origin to the end points returning backwardly either to the origin or to a selected one of the intermediate nodes.

It will readily be understood that a plurality of binary bits may be assigned to each path part. The number of intermediate nodes may be different depending on the paths between the origin and the end points. If the output serial bit sequence should start at a prescribed one of the parallel bits of the memorized bit groups that is not included in the total held bits at a time, the held bits should be renewed under the control of the input-output controller 34 so that the prescribed bit should be stored in one of the first and the second shift registers 21 and 22.

While this invention has thus far been described in specific conjunction with a single embodiment thereof, it will now be readily possible for one skilled in the art to carry this invention into effect and to use this invention in various other manners. For example, the circuit output terminal 12 may differently be connected to a selected one of the first and the second bidirectional shift registers 21 and 22. The serial input-output circuit may be used as an interface between the circuit input terminal 11 and the circuit output terminal 12 which is connected to a bit serial error detecting and correcting circuit.

What is claimed is:

1. In a serial input-output circuit comprising an input shift register supplied with an input serial bit sequence for producing a sequence of output bit groups, each consisting of a first predetermined number of parallel bits, a memory device for memorizing said output bit groups as memorized bit groups, and output means connected to said memory device for producing a predetermined part of said memorized bit groups as an output serial bit sequence selectively forwardly and backwardly of said input serial bit sequence, the improvement wherein said output means comprises:

first and second bidirectional shift registers, each for one of said memorized bit groups;

storing means connected to said memory device and said first and said second bidirectional shift registers for bit parallel storing the parallel bits of a selected one of said memorized bit groups as partial held bits in a selected one of said first and said second bidirectional shift registers;

shifting means for bidirectionally shifting through said first and said second bidirectional shift registers total held bits held in said first and said second bidirectional shift registers; and producing means connected to one of said first and said second bidirectional shift registers for producing a second predetermined number of the total held bits in bit series as said predetermined part of the memorized bit groups.

2. A serial input-output circuit as claimed in claim 1, said first bidirectional shift register having a first forward and a first backward input terminal and a first forward and a first backward output terminal, said second bidirectional shift register having a second forward and a second backward input terminal and a second forward and a second backward output terminal, said shifting means including a bidirectional connection between said first forward output terminal and said second forward input terminal and between said second backward output terminal and said first backward input terminal, wherein:

said shifting means comprises a ring connection connecting said first backward output terminal to said second backward input terminal and connecting said second forward output terminal directly to said first forward input terminal for selectively backwardly and forwardly shifting said total held bits;

said producing means being connected to said second backward output terminal.

3. A serial input-output circuit as claimed in claim 1, wherein said storing means comprises:

first and second bit parallel connections connected to said first and said second bidirectional shift registers, respectively, and directly to said memory device;

register selecting means for selecting one of said first and said second bidirectional shift registers as a selected shift register;

group selecting means connected to said memory device for selecting one of said memorized bit groups as a selected bit group; and supplying means connected to said first and said second bit parallel connections and to said group selecting means for supplying said selected bit group to said selected shift register.

4. A serial input-output circuit as claimed in claim 3, said total held bits including an earliest and a latest bit which are two of the parallel bits of two successively selected bit groups and are arranged earliest and latest in said input serial bit sequence, wherein:

said register selecting means select a particular one of said first and said second bidirectional shift registers as said selected shift register that holds said earliest and said latest bits if at least one of the parallel bits of said memorized bit groups should be produced in said output serial bit sequence following said latest and said earliest bits while said output serial bit sequence is produced forwardly and backwardly of said input serial bit sequence, respectively;

said group selecting means selecting as a single selected bit group one of said memorized bit groups that follows and precedes said two successively selected bit groups;

said supplying means supplying said single selected bit group to said particular one of the first and the second bidirectional shift registers.

* * * * *